(12) United States Patent
Singh et al.

(10) Patent No.: US 12,229,608 B2
(45) Date of Patent: Feb. 18, 2025

(54) DYNAMIC, HIDDEN, NON-FUNGIBLE TOKEN ("NFT") PLACEHOLDERS FOR USE WITH QUICK-RESPONSE ("QR") CODE FRAUD PREVENTION TECHNOLOGY

(71) Applicant: Bank of America Corporation, Charlotte, NC (US)

(72) Inventors: Shailendra Singh, Maharashtra (IN); Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/434,649

(22) Filed: Feb. 6, 2024

(65) Prior Publication Data
US 2024/0289581 A1 Aug. 29, 2024

Related U.S. Application Data

(60) Provisional application No. 63/447,927, filed on Feb. 24, 2023.

(51) Int. Cl.
*G06K 19/06* (2006.01)
*G06K 7/14* (2006.01)

(52) U.S. Cl.
CPC ..... *G06K 19/06046* (2013.01); *G06K 7/1408* (2013.01); *G06K 19/06037* (2013.01)

(58) Field of Classification Search
CPC .............. G06K 7/1408; G06K 7/1417; G06K 19/06046; G06K 19/06037
See application file for complete search history.

(56) References Cited

U.S. PATENT DOCUMENTS

2018/0107915 A1\* 4/2018 Toedtli ............. G06K 19/06028

\* cited by examiner

*Primary Examiner* — Laura A Gudorf
(74) *Attorney, Agent, or Firm* — Weiss & Arons LLP (57) ABSTRACT

A method for increasing the security of quick response ("QR") code processing may include creating an inactive QR code. The inactive code may include an algorithmic code and a plurality of dynamic placeholders. The method may retrieve a scan of the inactive QR code using a QR code scanning device and also prevent the scan of the inactive QR code from being processed at the QR code scanning device. The method may receive the scan of the inactive QR code at a central server and interpret the algorithmic code to identify a plurality of non-fungible tokens ("NFTs") for filling the plurality of dynamic placeholders. The method may fetch the plurality of NFTs and complete the incomplete QR code to form a complete QR code. The completing may include filling the plurality of dynamic placeholders with the plurality of NFTs and interpreting the complete QR code.

17 Claims, 8 Drawing Sheets

DYNAMIC, HIDDEN, NON-FUNGIBLE TOKEN ("NFT") PLACEHOLDERS FOR USE WITH QUICK-RESPONSE ("QR") CODE FRAUD PREVENTION TECHNOLOGY

CROSS-REFERENCE TO RELATED APPLICATION

This application is a non-provisional application of U.S. Provisional Patent Application No. 63/447,927, filed on Feb. 24, 2023, entitled "DYNAMIC, HIDDEN, NON-FUNGIBLE TOKEN ("NFT") PLACEHOLDERS FOR USE WITH QUICK-RESPONSE ("QR") CODE FRAUD PREVENTION TECHNOLOGY."

FIELD OF TECHNOLOGY

Aspects of the disclosure relate to preventing fraudulent QR-code schemes.

BACKGROUND OF THE DISCLOSURE

Conventional payment instruments are shifting to online payment technologies such as for example the Unified Payments Interface developed by National Payments Corporation of India ("NPCI"). This is but one instance of a real-time payment system. The exemplary interface facilitates inter-bank peer-to-peer ("P2P") and person-to-merchant ("P2M") transactions. It can be used on mobile devices to instantly transfer funds between two bank accounts.

Not surprisingly, QR code fraud is emerging as a significant source of financial fraud. Fraudsters are circulating fraudulent QR codes to misdirect payment(s) into fraudster's account(s). Alternatively, they are using fake QRs to install malware into a user's mobile device and/or misappropriate financial institution (FI) or other critical payment information.

Conventionally, all the current mechanisms to deal with such scenarios are reactive approaches and not proactive approaches. A payment technology user is informed about the payment or loss of funds when the transaction has already happened. In such approaches, there is no way to prevent fraud prior to the occurrence thereof.

It would be desirable to provide a technology which enables an FI to proactively identify the potential fake QR code in the middle of the transaction, on the fly, prior to actually consummating the money transfer or information transfer.

SUMMARY OF THE DISCLOSURE

A method for increasing the security of quick response ("QR") code processing is provided. The method may include creating an inactive or at least partially inactive QR code. The inactive QR code may include an algorithmic code. The algorithmic code preferably encodes locations of a plurality of dynamic placeholders. The method may include receiving a scan of the inactive QR code, and then further interpreting the algorithmic code to identify a plurality of non-fungible tokens ("NFTs") for filling the plurality of dynamic placeholders. The method may then include fetching the plurality of NFTs and completing the incomplete QR code to form a complete QR code. The completing may include filling the plurality of dynamic placeholders with the plurality of NFTs. Once the QR code is completed, the method may include interpreting the complete QR code.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

A technology according to the disclosure can significantly mitigate attempts to derail and defraud the QR payments industry. Such a technology could significantly improve the fidelity of the QR payments industry.

Embodiments of the invention preferably create one or more dynamic hidden NFT placeholder(s) QR for use with code fraud prevention technology. These placeholders preferably enable the QR codes with preferably substantially everchanging dynamic hidden placeholders. It should be noted that, while the disclosure herein is directed to QR codes, the scope of the invention should be understood to cover any machine-readable labels such as, for example, bar codes or other suitable machine-readable labels.

Any mobile, or other, device will not be able to scan these QR codes absent, or independent of, some of these hidden placeholders. These placeholders are filled with valid NFTs at run time—i.e., at the time the QR code is ready to be fully executed, having been fetched from the relevant FI. Once some or all of the placeholders are filled, then, and preferably only then, the QR code is considered fully operational—i.e., complete and fully scannable—and will be viable to fetch account and/or customer's information.

The aforementioned technology preferably generates and/or maintains the QR codes in an unreadable and incomplete state pending the retrieval and completion of the dynamic placeholders.

Preferably, the FI designates which hidden placeholders are to be filled, and the positions in which they will be filled. This information can be based on a database maintained by the FI.

For example, if, with the last transaction involving the QR code, placeholders 1 and 9 were filled, then, with the next transaction, placeholders 1 and 9 will not be filled and the FI will pick 3rd and 4th placeholders to be filled.

Which ones and how many placeholders to be filled with which NFTs, may, in certain embodiments, be governed by an algorithmic number or code stored in the QR. The placeholders can preferably only be interpreted by the FI.

Also, this technology preferably decisions with which past transaction NFT to fill the QR code. In preferred embodiments, the FI never repeats the NFT used, to fill the QR code. Even if a fraudster compromises the code and tries to reuse the placeholder information, the fraudster will not be able to complete the QR code because the next set of placeholders will be different from the prior set of placeholders. In certain embodiments, only the FI may know which NFTs need to be placed. Any change in the pattern or information preferably flags the QR as fake or at least incomplete.

A method for increasing the security of quick response ("QR") code processing is provided. The method includes creating an inactive or partially inactive QR code. The QR code may be inactive because it is incomplete or for some other reason. The inactive QR code may include an algorithmic code and a plurality of dynamic placeholders.

The method may further include receiving a scan of the inactive QR code, interpreting the algorithmic code to identify a plurality of non-fungible tokens ("NFTs") for filling the plurality of dynamic placeholders, fetching the plurality of NFTs, and completing the incomplete QR code to form a complete and fully active (operational) QR code. It should be noted that the completing may include filling the plurality of dynamic placeholders with the plurality of NFTs. Finally, the method may include interpreting the complete QR code.

In some embodiments of the method, the plurality of NFTs may be based on one or more previous transactions involving a legacy complete QR code. The legacy complete QR code may be based at least in part on at least a portion of the incomplete QR code.

In certain embodiments, the algorithmic code may identify the plurality of NFTs based at least in part on the one or more previous transactions.

In some embodiments, the location within the QR code for each of the plurality of dynamic placeholders may be determined based on the algorithmic code.

Certain embodiments of the methods according to the disclosure may include increasing the security of quick response ("QR") code processing. Such embodiments may include creating an inactive QR code. The inactive QR code may include an algorithmic code and a plurality of dynamic placeholders.

The method may also include retrieving a scan of the inactive QR code using a QR code scanning device, preventing the scan of the inactive QR code from being processed at the QR code scanning device, receiving the scan of the inactive QR code at a central server, interpreting the algorithmic code to identify a plurality of non-fungible tokens ("NFTs") for filling the plurality of dynamic placeholders, fetching the plurality of NFTs and completing the incomplete QR code to form a complete QR code. The completing may include filling the plurality of dynamic placeholders with the plurality of NFTs.

The method may also include interpreting, or otherwise interacting with, the complete QR code.

In certain embodiments of the immediately foregoing method, the plurality of NFTs may be based on one or more previous transactions using a legacy complete QR code. The legacy complete QR code may include the incomplete QR code.

In some embodiments, the algorithmic code may identify the plurality of NFTs based at least in part on the one or more previous transactions.

In certain embodiments, a location within the QR code for each of the plurality of dynamic placeholders may be determined based on the algorithmic code.

In some embodiments of the foregoing method, the preventing the scan of the inactive or partially inactive QR code from being processed at the QR code scanning device may also include installing code on the QR code scanning device. It should be understood that the installation of code may prevent any scan from being processed absent insertion of the NFTs.

It should be noted as well that the method may include preventing the scan of the inactive QR code from being processed at the QR code scanning device such that the installing code on the QR code scanning device prevents any scan from being processed at the QR code scanning device absent instruction from the central server that the QR code scanning device is located in a physical location that corresponds to information preferably derived from a Uniform Resource Locator ("URL") identified by a scanned code. Such embodiments may be referred to as "geo-fencing" embodiments—i.e., that enable use of selected scanners only within a selected geographic area.

A method for increasing the security of quick response ("QR") code processing is provided. The method may include creating an inactive QR code. The inactive QR code may include an algorithmic code and code for placement of, or storage for, a plurality of dynamic placeholders.

The method may further include retrieving a scan of the inactive QR code using a QR code scanning device, preventing the scan of the inactive QR code from being processed at the QR code scanning device, receiving the scan of the inactive QR code at a central server, completing the incomplete QR code to form a complete QR code and interpreting, at the central server, the complete QR code.

In other embodiments of methods for increasing the security of machine-readable label processing, the disclosure may include creating a machine-readable label. The machine readable label may include an algorithmic code and a plurality of dynamic placeholders.

The method may further include receiving a scan of an inactive machine-readable label, interpreting the algorithmic code to identify a plurality of non-fungible tokens ("NFTs") for filling the plurality of dynamic placeholders, fetching the plurality of NFTs and completing the incomplete machine-readable label to form a complete machine-readable label. The completing may include filling the plurality of dynamic placeholders with the plurality of NFTs and interpreting the complete machine-readable label.

The following figures and associated written specifications set forth the invention in additional detail to the foregoing.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
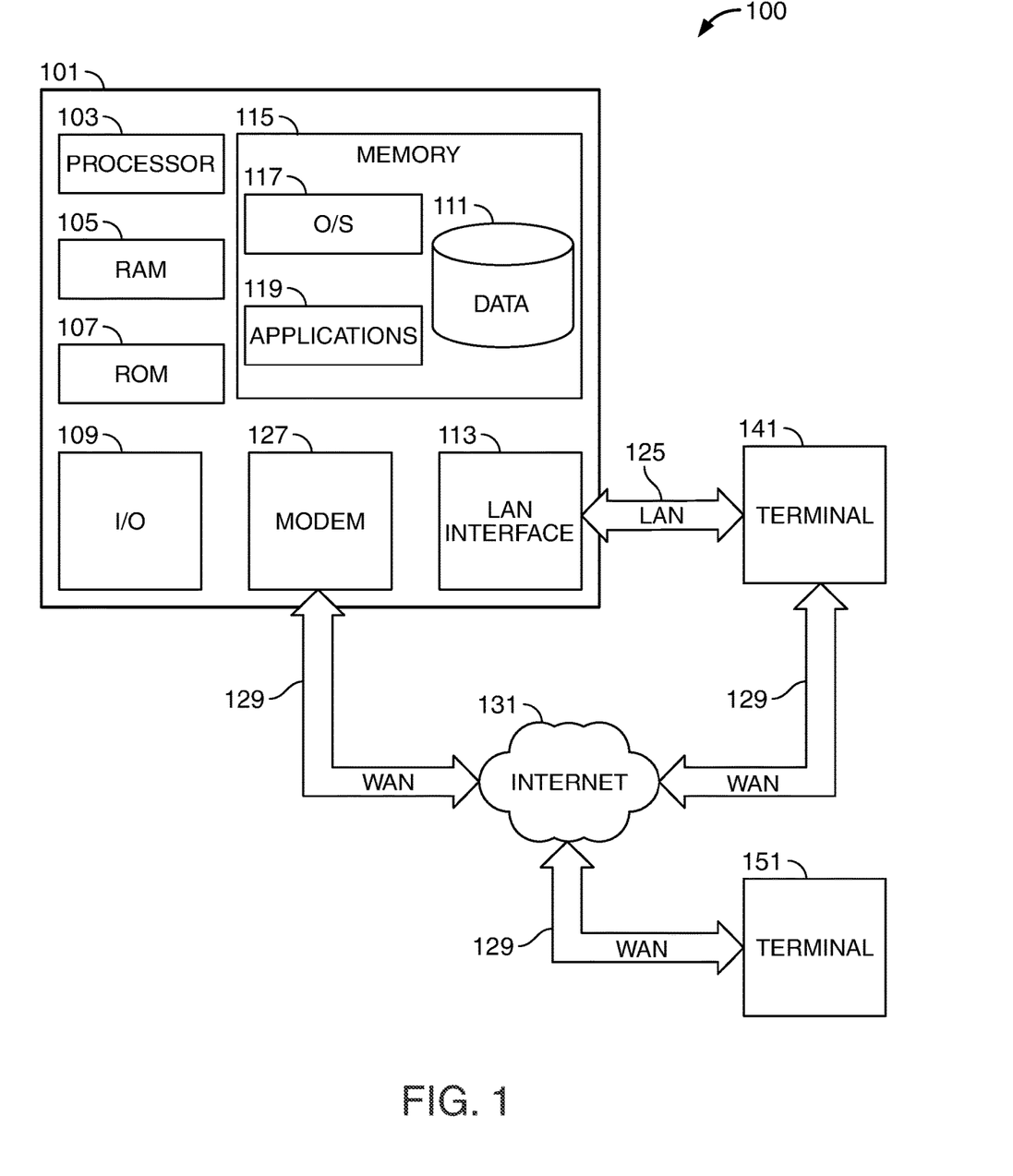
FIG. 1 shows an illustrative system in accordance with principles of the disclosure.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
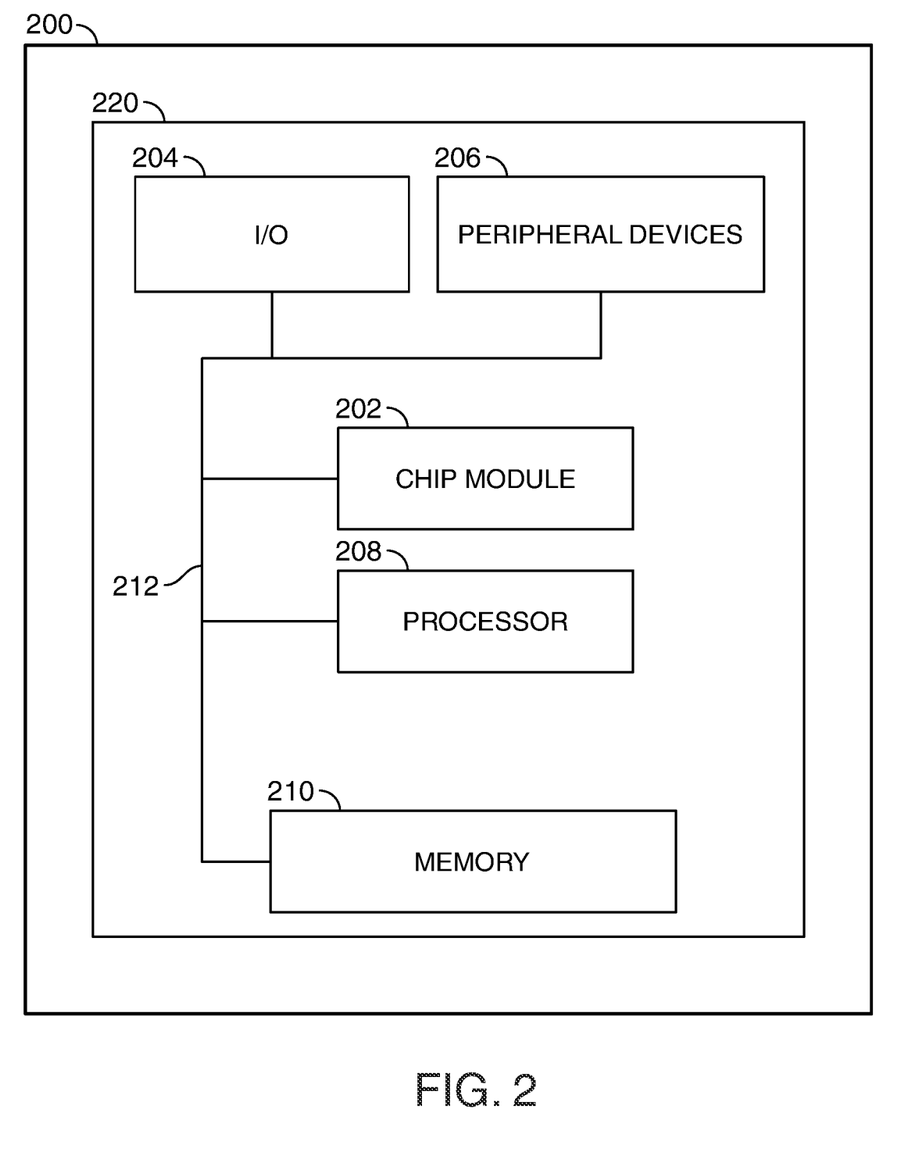
FIG. 2 shows an illustrative system in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
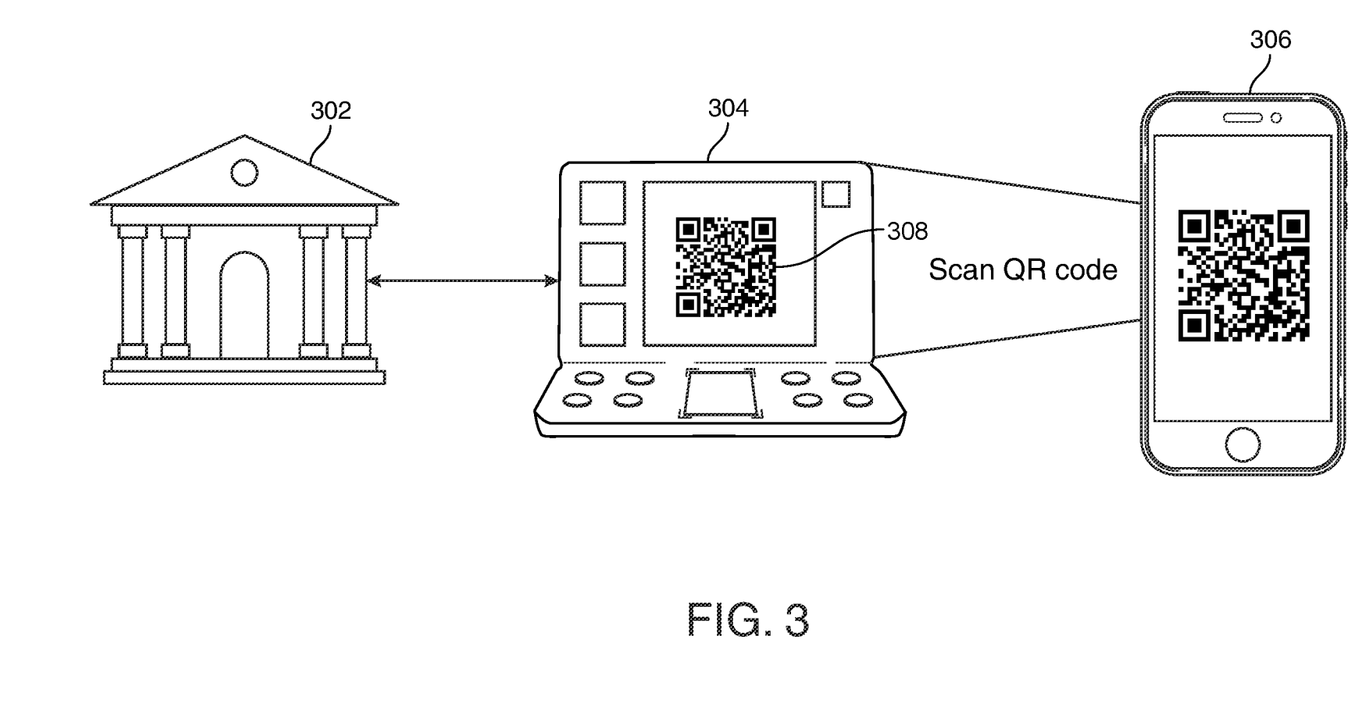
FIG. 3 shows a schematic diagram of a secure QR code generation apparatus in accordance with principles of the disclosure.

FIG. 3 shows a schematic diagram of a secure QR code generation apparatus in accordance with principles of the disclosure. At 302, an FI is shown. At 304, a QR-code generating device is shown. At 306, a mobile device is shown which can be used to scan the QR code 304 generated by QR-code generating device 304. In one embodiment, a method according to the embodiments preferably ensures that QR generation device 304 is not used for tampering, in some way, with the generated QR code.

In some embodiments, meta data properties of the QR-code generating device 304 confine QR-code generating to generating QR-codes that include dynamic placeholders, as set forth herein.

Figure 4:
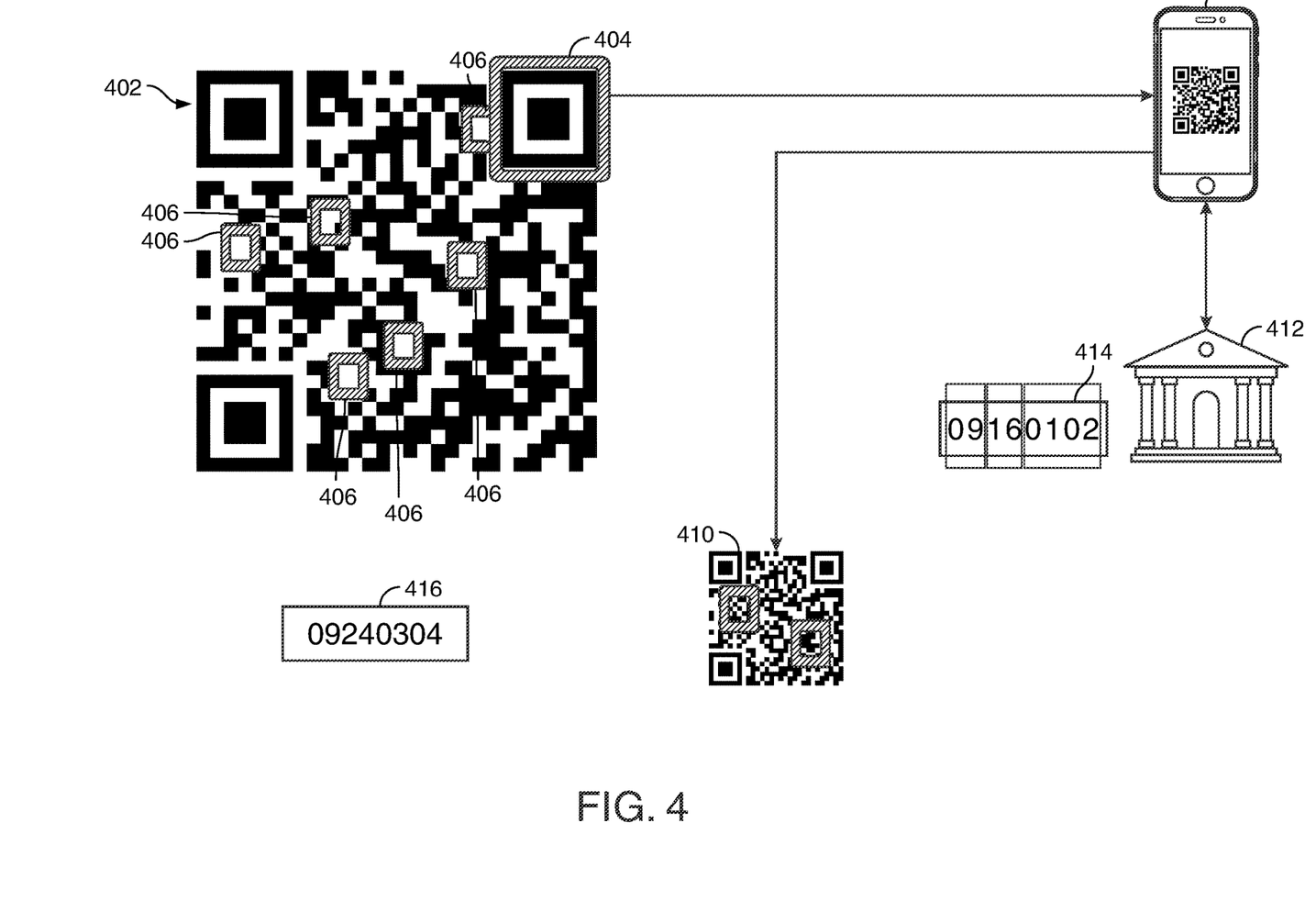
FIG. 4 shows a schematic diagram of a QR code with dynamic placeholders in accordance with principles of the disclosure.

FIG. 4 shows a schematic diagram of a QR code 402 with dynamic placeholders 406 in accordance with principles of the disclosure. QR code 402 is an incomplete QR code—i.e., inactive to the extent that it cannot execute instructions stored therein absent filling with appropriate dynamic placeholders 406. An algorithm field (such as field 404 or other suitable field) preferably informs an FI 412, via a mobile scanning device 408, which placeholders 406 within the QR code 402 are to be filled.

At 414, a representative of an exemplary algorithm is shown. Exemplary algorithm representative 414 includes "09" which indicates that algorithm No. 9 is to be used to select the placeholders for QR code 402. "16" indicates that fields 1 and 6 within QR code 402 are to be completed. "0102" indicates that the last and second to last transactions associated with the scanned QR code are selected to be mined to retrieve the information necessary to fill in placeholders 406.

At 410, the QR code has been completed with the missing placeholder information.

At 416, a second exemplary algorithm is shown. Such an algorithm may be associated with a different QR code.

Figure 5:
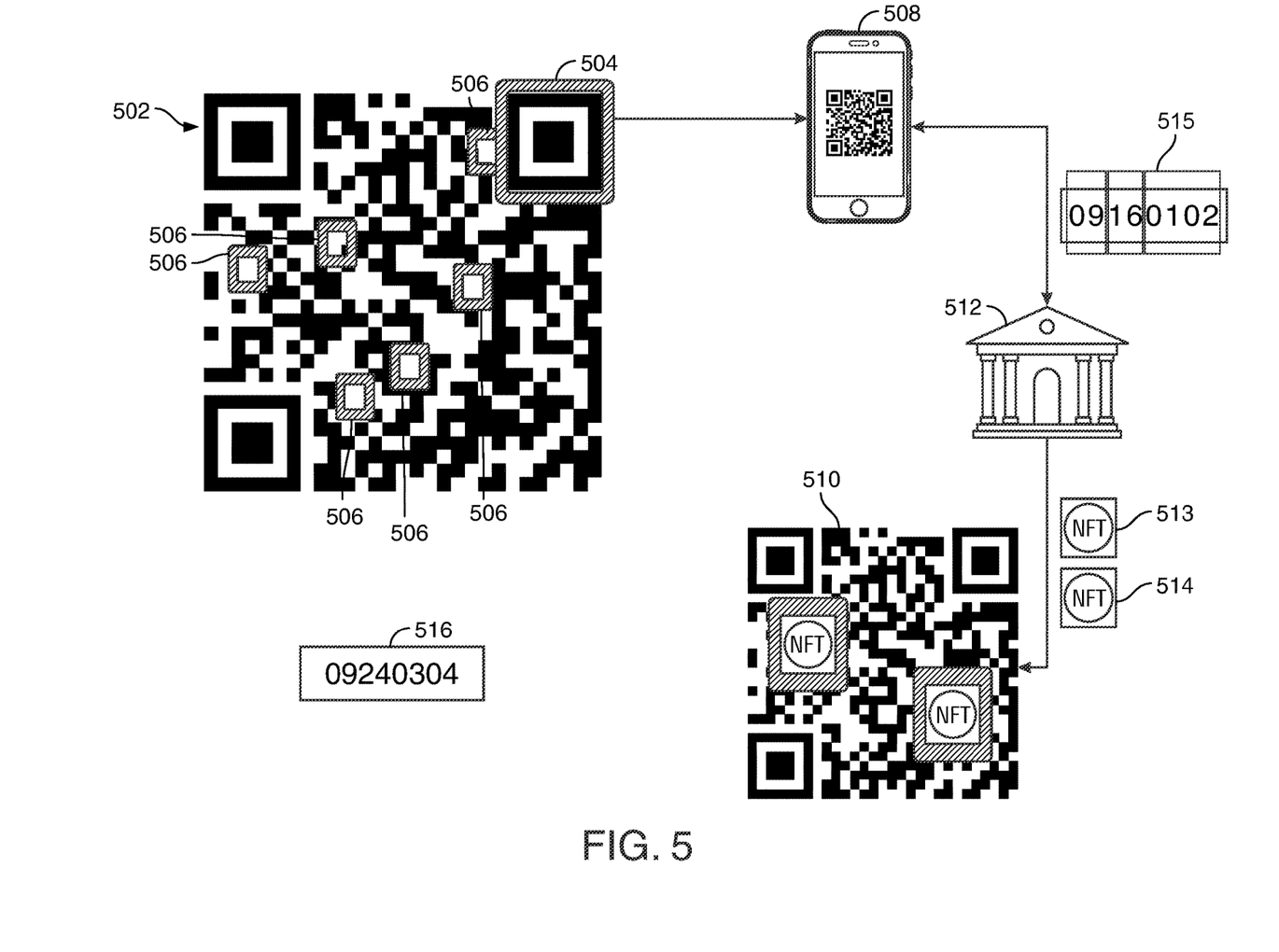
FIG. 5 shows a schematic diagram of a QR code validation procedure in accordance with principles of the disclosure.

FIG. 5 shows a schematic diagram of a QR code validation procedure in accordance with principles of the disclosure. It should be noted that in FIG. 5, elements 502, 504, 506, 508, 512, 515 and 516 substantially correspond to the elements 402, 404, 406, 408, 412, 414 and 416 in FIG. 4.

One significant difference between FIG. 4 and FIG. 5 is shown at NFTs 513 and 514. In the embodiment shown in FIG. 5, NFTs 513 and 514 have been leveraged to fill the placeholders, as shown in QR code 510. Preferably, the technology according to the embodiments fetch legacy transaction NFTs, or other suitable NFTs, in a dynamic sense to fill the placeholders in order to complete QR code 510.

Figure 6:
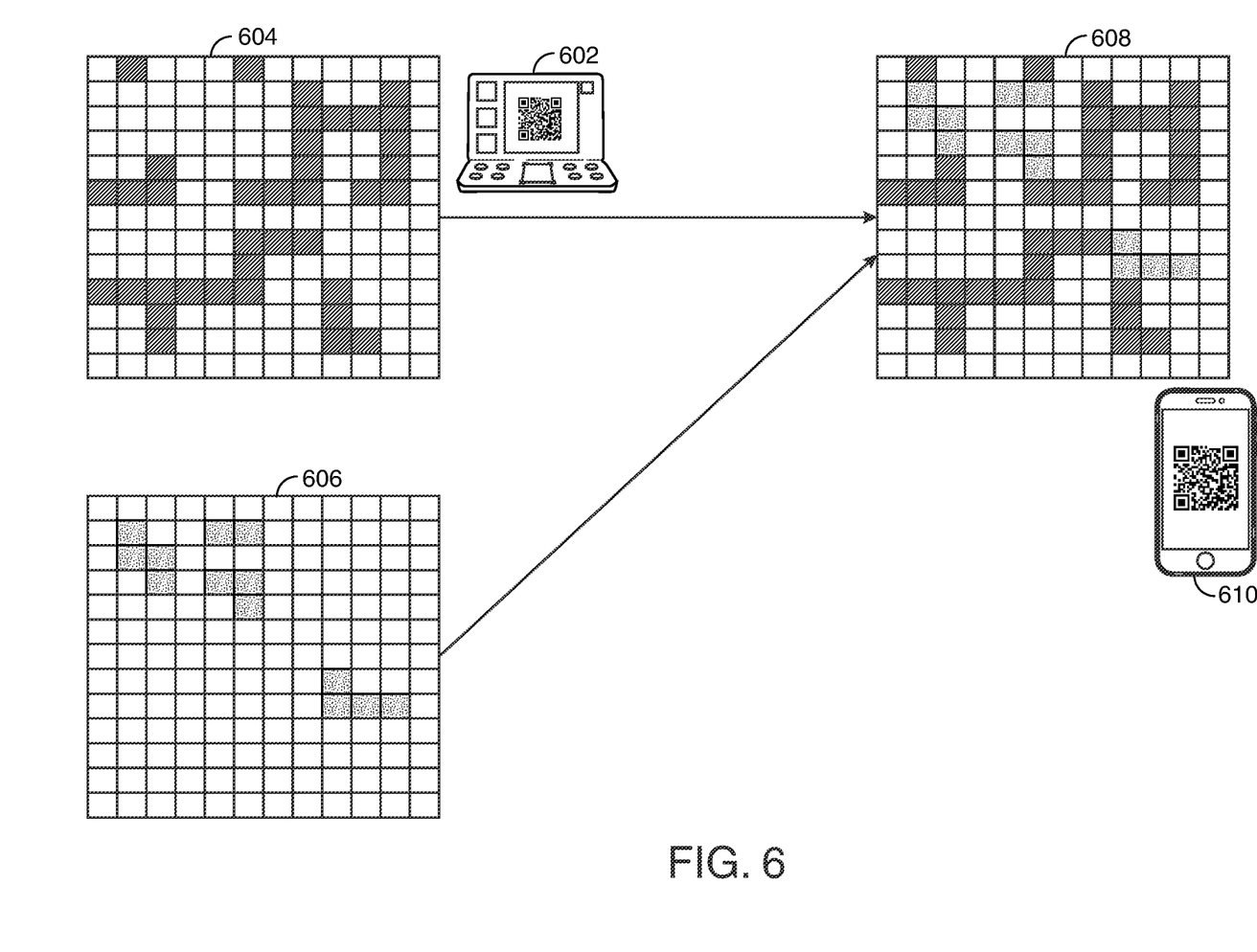
FIG. 6 shows another schematic diagram of a secure QR code generation apparatus in accordance with principles of the disclosure.

FIG. 6 shows another schematic diagram of a secure QR code generation apparatus in accordance with principles of the disclosure. At 602, a QR code generating device is shown. At 604, it is indicated that QR code generating device 602 is preferably configured to generate an incomplete QR code 604 with dynamic placeholders—i.e., placeholders that are configured to shift from one region of the QR code to a different region of the QR code for preferably each and every scan event.

Element 606 shows, schematically, minting NFTs for use with algorithmically-generated dynamic placeholder QR patterns. Specifically, the NFTs that are shown as minted in 606 may be combined with incomplete QR code 604.

At 608, a complete QR code is shown. The complete QR code 608 may preferably be scanned by a QR scanning device 610 to obtain desired results—e.g., whether to retrieve certain information or to guide a user to a predetermined URL.

Figure 7:
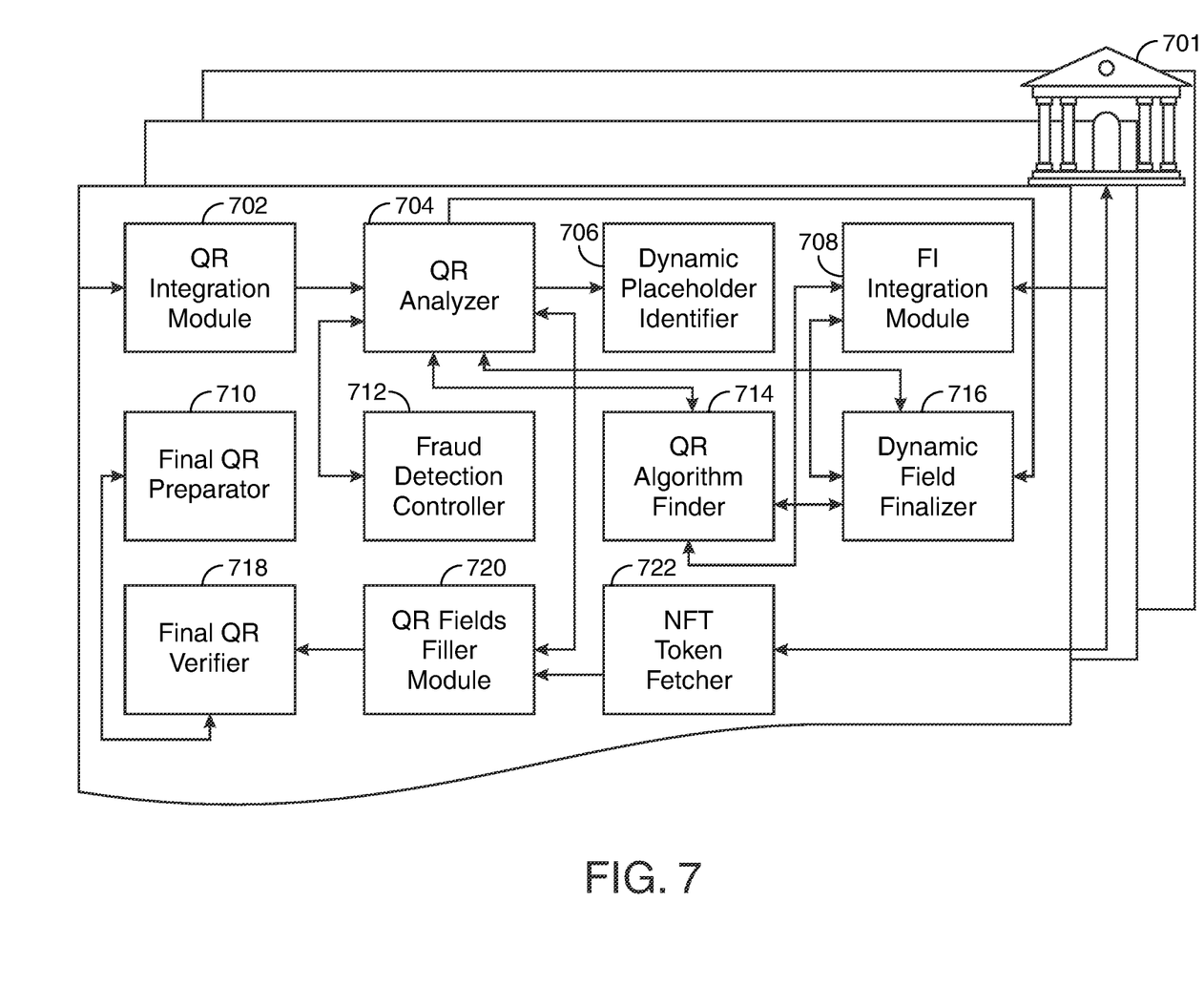
FIG. 7 shows an illustrative flow diagram in accordance with principles of the disclosure.

FIG. 7 shows an illustrative flow diagram in accordance with principles of the disclosure. At 702, a QR integration module is shown. This module 702 serves to integrate the QR code, and the associated uptake of the QR code, with the scanner. The QR code analyzer, which is shown at 704 as being coupled to QR integration module 702, is for reading and interpreting the QR code. This preferably represents the very first analysis of the QR code which has been scanned. In some embodiments, QR code analyzer 704 may be used to immediately transfer the scanned QR code, preferably prior to analysis, to a secure FI backend, thereby preventing any uptake of information at the scanner and sending the QR for a safe analysis at the FI backend, preferably isolated from the mainstream portion(s) of the scanner. In so doing, the portions of the scanner that can be attacked are preferably protected from the portion(s) of the scanner that are used to initiate verification the analysis.

A dynamic placeholder identifier 706 identifies the placeholder locations, preferably using a proprietary and secure algorithm, within the QR code that needs completion. The FI integration module 708 is responsible for communicating with the FI in order to help retrieve the information associated with placeholders. Such information may include deciphering the algorithm that is used to retrieve the correct placeholders.

The dynamic field finalizer 716 finalizes, based on the algorithm, which fields are to be filled with the imported NFTs. QR algorithm finder 714 is preferably the actual mechanism that identifies the algorithm at the FI.

Fraud detection controller 712 preferably identifies whether some physical tampering has been done with the QR code, or other sort of tampering has been done, at least because one, more than one or all of the dynamic placeholders are absent or the QR code has changed its structures from the last time. Such structures may include location of the dynamic placeholders with the QR-code.

In essence, fraud detection controller 712 receives and explores any deviation in the QR code from past scans of the same code, or, alternatively, scans of co-located, but different, QR codes and preferably reports same.

The NFT token fetcher 722 preferably retrieves NFTs from previous transactions, or from some other storage location, at the FI. The retrieved NFTs may be used, as set forth herein, to fill the placeholders that have been determined according the QR scan, and the QR fields filler module preferably receives the retrieved NFTs and inserts the retrieved NFTs into the placeholder locations determined above by the dynamic field finalizer 716. The final QR preparator 710 can then preferably finalize the QR code and verify the QR code using the final QR verifier 718.

It should be noted that the QR code is preferably prevented from being fully processed by the scanner and within the central server prior to full verification. That is to say that one or more applications may be hosted on the scanner and within the central server that prevents QR code processing prior to resolution and verification of the QR code by some or preferably all of the full architecture set forth in FIG. 7.

Thereafter, the QR code can be processed by one or more processors as performed in line with conventional QR code protocols.

Figure 8:
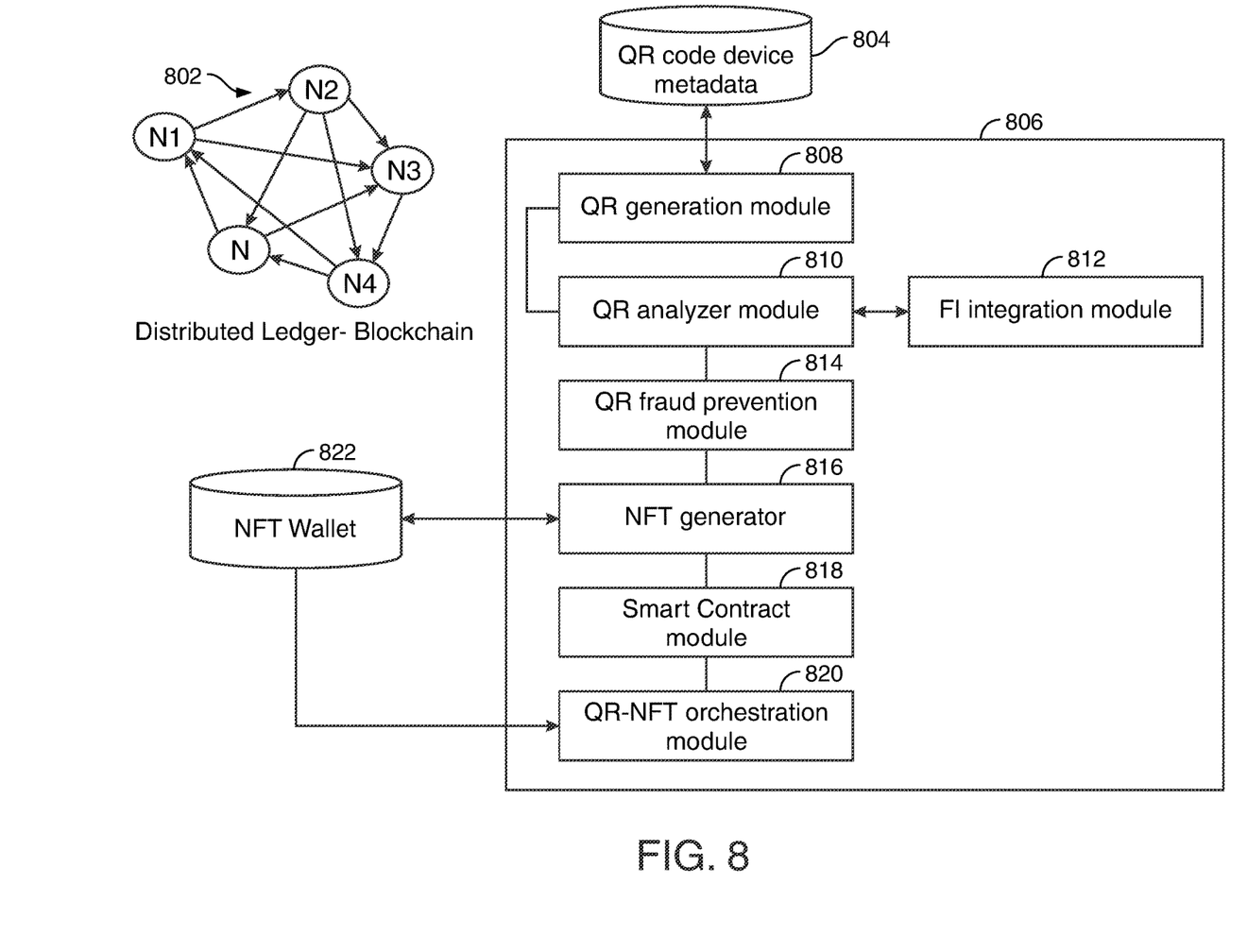
FIG. 8 shows an illustrative architecture diagram in accordance with principles of the disclosure.

FIG. 8 shows an illustrative architecture diagram in accordance with principles of the disclosure. At 802, a schematic diagram of a distributed ledger—blockchain is shown. At 804, a QR code device metadata database is shown. QR code device metadata database 804 preferably interacts with system 806 in such a way as to provide QR code information (including QR code metadata) from a QR code scanning device. The metadata may include data reflective of the QR code scanning device as well as the QR code itself. In certain algorithms according to the disclosure, data reflective of the QR code scanning device may form part of the verification algorithm—i.e., the scanning device information may be used as a part of the algorithm.

Also shown in FIG. 8 is a QR generation module 808 which may be involved with the formation of QR codes together with the placeholders. QR generation module 808 may be in communication with the QR analyzer module 810, which itself is in communication with an FI integration module. QR analyzer module 810 may also be in communication with a QR fraud prevention module according to the embodiments set forth herein.

An NFT generator 816 is shown at 816, which may be in communication with an NFT wallet (preferably external to system 806) as well as a smart contract module 818. The NFT wallet may be used to store NFTs and, thereafter, to retrieve NFTs to fill the placeholders. In addition, a QR-NFT orchestration module is shown at 820 which will preferably enable methods according to the embodiments for adding existing NFTs to the NFT placeholders to provide a completed and verified QR code.

Thus, methods and apparatus for providing DYNAMIC, HIDDEN, NON-FUNGIBLE TOKEN ("NFT") PLACEHOLDERS FOR USE WITH QUICK-RESPONSE ("QR") CODE FRAUD PREVENTION TECHNOLOGY are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for increasing security of quick response ("QR") code processing, the method comprising:
   creating an inactive QR code comprising:
      an algorithmic code; and
      a plurality of dynamic placeholders;
   receiving a scan of the inactive QR code;
   interpreting the algorithmic code to identify a plurality of non-fungible tokens ("NFTs") for filling the plurality of dynamic placeholders;
   fetching the plurality of NFTs;
   completing the inactive QR code to form a complete QR code, said completing comprising filling the plurality of dynamic placeholders with the plurality of NFTs; and
   interpreting the complete QR code.

2. The method of claim 1, wherein the plurality of NFTs is based on one or more previous transactions involving a legacy complete QR code, said legacy complete QR code being based in part on at least a portion of the inactive QR code.

3. The method of claim 2, wherein the algorithmic code identifies the plurality of NFTs based at least in part on the one or more previous transactions.

4. The method of claim 1, wherein a location within the QR code for each of the plurality of dynamic placeholders is determined based on the algorithmic code.

5. A method for increasing security of quick response ("QR") code processing, the method comprising:
   creating an inactive QR code comprising:
      an algorithmic code; and
      a plurality of dynamic placeholders;
   retrieving a scan of the inactive QR code using a QR code scanning device;
   preventing the scan of the inactive QR code from being processed at the QR code scanning device;
   receiving the scan of the inactive QR code at a central server;
   interpreting the algorithmic code to identify a plurality of non-fungible tokens ("NFTs") for filling the plurality of dynamic placeholders;
   fetching the plurality of NFTs;

completing the inactive QR code to form a complete QR code, said completing comprising filling the plurality of dynamic placeholders with the plurality of NFTs; and interpreting the complete QR code.

6. The method of claim 5, wherein the plurality of NFTs is based on one or more previous transactions involving a legacy complete QR code, said legacy complete QR code being based in part on at least a portion of the inactive QR code.

7. The method of claim 6, wherein the algorithmic code identifies the plurality of NFTs based at least in part on the one or more previous transactions.

8. The method of claim 5, wherein a location within the QR code for each of the plurality of dynamic placeholders is determined based on the algorithmic code.

9. The method of claim 5, the preventing the scan of the inactive QR code from being processed at the QR code scanning device further comprising installing code on the QR code scanning device that prevents any scan from being processed absent insertion of the NFTs.

10. The method of claim 5, the preventing the scan of the inactive QR code from being processed at the QR code scanning device further comprising installing code on the QR code scanning device that prevents any scan from being processed at the QR code scanning device absent instruction from the central server that the QR code scanning device is located in a location that corresponds to a Uniform Resource Locator ("URL") identified by a scanned code.

11. A method for increasing security of quick response ("QR") code processing, the method comprising:
    creating an inactive QR code comprising:
        an algorithmic code; and
        a plurality of dynamic placeholders;
    retrieving a scan of the inactive QR code using a QR code scanning device;
    preventing the scan of the inactive QR code from being processed at the QR code scanning device;
    receiving the scan of the inactive QR code at a central server;
    completing the inactive QR code to form an active QR code; and
    interpreting, at the central server, the active QR code.

12. A method for increasing security of machine-readable label processing, the method comprising:
    creating a machine-readable label comprising:
        an algorithmic code; and
        a plurality of dynamic placeholders;
    receiving a scan of an incomplete machine-readable label;
    interpreting the algorithmic code to identify a plurality of non-fungible tokens ("NFTs") for filling the plurality of dynamic placeholders;
    fetching the plurality of NFTs;
    completing the incomplete machine-readable label to form a complete machine-readable label, said completing comprising filling the plurality of dynamic placeholders with the plurality of NFTs; and
    interpreting the complete machine-readable label.

13. The method of claim 12, wherein the plurality of NFTs is based on one or more previous transactions involving a legacy complete quick response ("QR") code, said legacy complete QR code being based in part on at least a portion of the incomplete machine-readable code.

14. The method of claim 13, wherein the algorithmic code identifies the plurality of NFTs based at least in part on the one or more previous transactions.

15. The method of claim 12, wherein a location within the incomplete machine-readable label for each of the plurality of dynamic placeholders is determined based on the algorithmic code.

16. The method of claim 12, further comprising preventing the scan of the incomplete machine-readable label from being processed at a QR code scanning device.

17. The method of claim 12, further comprising installing preventative code on a QR code scanning device, said preventative code that prevents any scan from being processed absent insertion of the NFTs.

* * * * *